United States Patent
DiChiara, Jr. et al.

(10) Patent No.: US 6,419,189 B1
(45) Date of Patent: Jul. 16, 2002

(54) HOT RUDDERVATOR APPARATUS AND METHOD FOR AN AEROSPACECRAFT

(75) Inventors: Robert A. DiChiara, Jr., Carlsbad; Robert E. French, San Gabriel; Conley Siddoway Thatcher, Placentia; Edward A. Zadorozny, Redondo Beach; Peter A. Hogenson, Long Beach, all of CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/703,568

(22) Filed: Nov. 1, 2000

(51) Int. Cl.[7] .................................................. B64C 1/00
(52) U.S. Cl. ...................... 244/123; 244/124; 244/35 R; 244/87; 244/131; 416/223 R
(58) Field of Search .................................. 244/123, 124, 244/35 R, 87, 131, 132; 416/223 R, 229 R

(56) References Cited

U.S. PATENT DOCUMENTS

| | | | |
|---|---|---|---|
| 4,962,904 A | * 10/1990 | Perry et al. .................. | 244/131 |
| 5,236,151 A | * 8/1993 | Hagle et al. ............. | 244/117 A |
| 5,439,353 A | * 8/1995 | Cook et al. .................. | 416/230 |
| 5,542,820 A | * 8/1996 | Eaton et al. ................. | 416/224 |
| 6,099,671 A | * 8/2000 | Pearson et al. .......... | 156/89.11 |

* cited by examiner

Primary Examiner—J. Woodrow Eldred
(74) Attorney, Agent, or Firm—Harness Dickey & Pierce P.L.C.

(57) ABSTRACT

A ruddervator for an aerospacecraft. The ruddervator is formed by a plurality of airfoil sections nestably disposed in side by side fashion and supported by a pair of titanium box beam frame elements extending through central openings in each of the airfoil sections. Each airfoil section includes an oxide fiber/oxide matrix-based ceramic matrix composite (oxide-CMC) panel made up of multiple plies of oxide-CMC fabric which are fused over a rigid ceramic foam insulation member. The lower ends of the frame elements are secured to a transition component comprising a conventional torque box. The ruddervator can be manufactured with less cost and lower weight over previous ruddervator designs which require one or more large skin sections which are mechanically fastened to a substructure. The ruddervator of the present invention further minimizes fabrication costs by using a common design for the nesting airfoil sections so that a common female lay-up mold can be used for fabricating all of the airfoil sections.

7 Claims, 3 Drawing Sheets

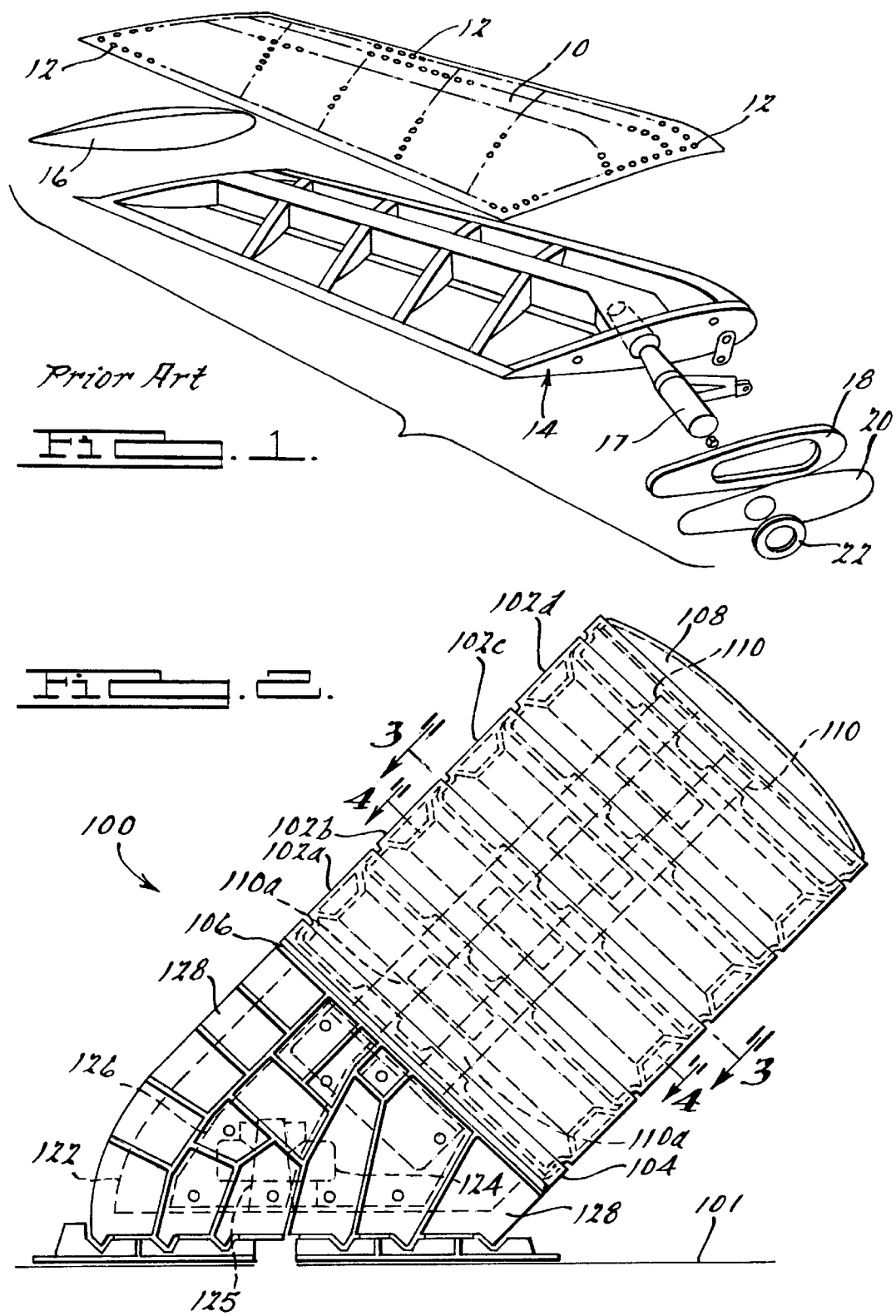

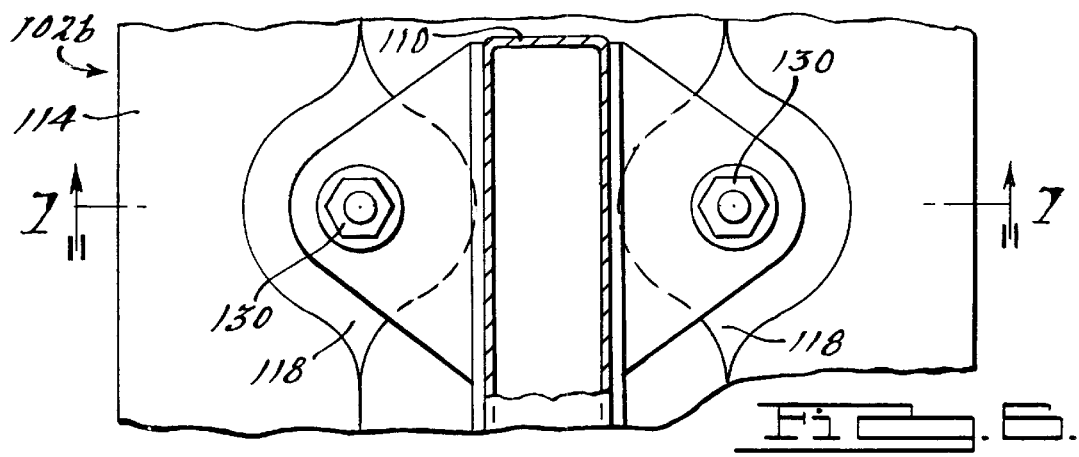
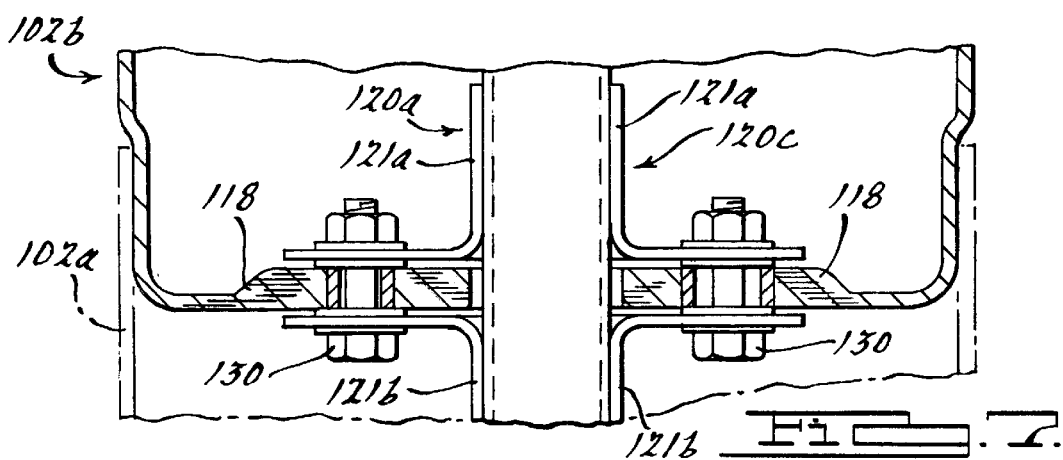
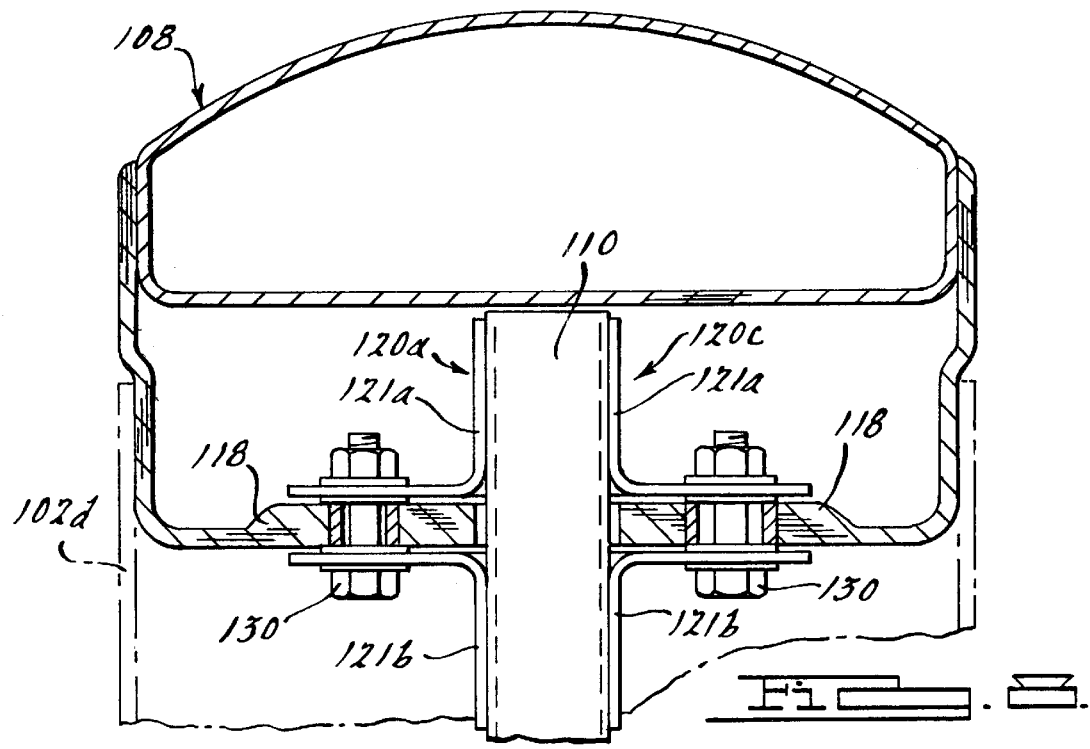

HOT RUDDERVATOR APPARATUS AND METHOD FOR AN AEROSPACECRAFT

TECHNICAL FIELD

This invention relates to airfoils for aerospacecraft, and more particularly to a ruddervator for an aerospacecraft which comprises a hybrid construction that enables lower production costs and improved life and reliability of the ruddervator.

BACKGROUND OF THE INVENTION

Current control surfaces for advanced aerospacecraft are formed by a carbon-based ceramic matrix composite (CMC) hot structure with conventional rib-stiffened structure and a mechanically fastened skin. The X-37 aerospacecraft presently in use incorporates a control surface termed a "ruddervator" with the above-described construction which makes use of carbon/silicon carbide (C/SiC). This construction is shown in FIG. 1. The mechanically fastened upper skin 10 is secured by a high temperature metal, ceramic or ceramic composite fasteners at locations 12 to an integral C/SiC lower skin and substructure 14. A C/SiC tail tip 16 is used to close the end of the ruddervator. A titanium spindle 17 is used to rotate the ruddervator as needed. Thermal protection system seals 18, 20 and ring 22 are used to help mount the ruddervator to the fuselage of the aerospacecraft.

The X-37 ruddervator approach described above uses an expensive 2800° F. CMC system in a 2400° F. "hot structure" application and uses an aircraft-like structural approach at the elevated temperature. The term "hot structure" refers to the temperature of the primary load-carrying structure, in this case the CMC and supports used at 2400° F. This construction reduces the service life of the fasteners. Furthermore, carbon-based CMCs generally require complex and costly tooling, unique and expensive infiltration/furnace facilities, and fabrication cycles of six months or more. The use of new materials under development, such as oxide fibers/oxide matrix-based CMC (Oxide-CMC), provide opportunities to design control surfaces in more cost-effective ways including, but not limited to, maintaining internal supports and attachments below 600° F.

For present and planned reusable hypersonic vehicles there are also size constraints on control surfaces due to available volume which restrict the use of conventional, lower cost structure insulated with bonded tile thermal protection. The current solution is to use the CMC for control surface hot structure in areas which do not require their extreme high temperature properties. The result is high initial and recurring costs for these parts as well as weight penalties at high part counts. Without an order of magnitude reduction in thermal structure costs, commercial reusable access to space will be difficult, if not impossible, to achieve.

It is therefore a principal object of the present invention to provide a new construction for a ruddervator for an aerospacecraft which can be produced more inexpensively from a simpler fabrication process, and which has improved life and reliability over the conventional mechanically fastened upper skin-to-substructure construction presently in use for ruddervator applications.

It is another object of the present invention to provide a hybrid control surface for an aerospacecraft which can be manufactured more economically, which is simpler to repair, and which does not make use of typical mechanical fasteners to secure an upper skin to a substructure.

It is still another object of the present invention to provide a ruddervator for an aerospacecraft having a simplified design which requires significantly fewer independent component parts being needed for the construction of the ruddervator.

SUMMARY OF THE INVENTION

The above and other objects are provided by an airfoil for an aerospacecraft. The airfoil comprises a ruddervator having a oxide fiber/oxide matrix-based ceramic matrix composite (oxide-CMC) fabric which is secured to a ceramic foam insulation in the shape of an airfoil section when viewed cord-wise. A plurality of airfoil sections attached adjacent to one another form the ruddervator.

The oxide-CMC fabric is fused over the rigid ceramic foam insulation. The rigid foam insulation includes a hollowed out area through which at least one frame element extends. The hollowed out area of each airfoil section includes a plurality of integrally formed securing members, which in the preferred embodiment comprise lugs, which are secured to structure on the frame element. In one preferred form the frame element comprises a titanium box beam.

Each of the airfoil sections are secured to the frame element such that a lower end of one panel is positioned nestably within an upper end of its lower adjacent airfoil section. The frame element is secured to a torque box of the aerospacecraft such that the entire airfoil can be rotated as needed during flight.

The airfoil of the present invention thus does not require mechanical fasteners to be used to secure a skin to an independent substructure. The construction of the present invention further serves to reduce the cost and weight of the airfoil in large part because of the lower cost, higher specific strength and stiffness of the materials employed. Cost is also reduced because with the common design of the nesting airfoil sections, a single female lay-up mold can be used for the fabrication of all of the oxide-CMC fabric/ceramic foam insulation airfoil sections. The manufacturing cost is further reduced by utilizing the reduced tooling complexities of oxide-CMC fabrication processes over CMC fabrication processes.

BRIEF DESCRIPTION OF THE DRAWINGS

The various advantages of the present invention will become apparent to one skilled in the art by reading the following specification and subjoined claims and by referencing the following drawings in which:

FIG. 1 is a perspective view of a prior art construction of a ruddervator for an aerospacecraft;

FIG. 2 is a side view of a ruddervator for an aerospacecraft in accordance with a preferred embodiment of the present invention;

FIG. 6 is an enlarged view of the area at which the lugs of the rigid foam insulation are secured to one of the titanium box beams forming the frame system of the ruddervator;

FIG. 7 is a side, partial cross-sectional view of the area shown in FIG. 6, taken along section line 7—7 in FIG. 6; and FIG. 8 is a side cross-sectional view of just the tip close-out panel secured to its adjacent airfoil section.

DETAILED DESCRIPTION OF THE PREFERRED EMBODIMENTS

Figure 3:
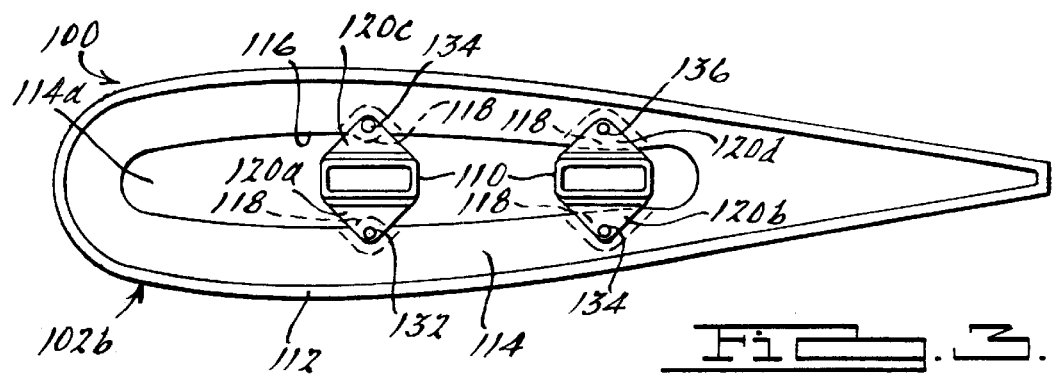
FIG. 3 is a cross sectional end view of one airfoil section of the ruddervator of FIG. 2 taken in accordance with section line 3—3 in FIG. 2.

Referring to FIG. 1, there is shown a ruddervator 100 for a hypersonic space vehicle such as an aerospacecraft 101. The ruddervator 100 is used to help steer the aerospacecraft during flight. The ruddervator 100 includes a plurality of identical airfoil sections 102a–102d which are secured adjacent to one another in a nesting fashion. Airfoil section 102a is disposed nestably within a oxide-CMC laminate closeout panel and thermal barrier retainer 104 which acts as both a lower overlapping close out seal and as part of the retainer for a standard flexible thermal barrier 106. At the upper end of the ruddervator 100 a specially designed oxide-CMC panel incorporates a close-out foam sandwich cap 108 which is secured to airfoil section 102d, and which closes off the upper end of the ruddervator 100.

Figure 4:
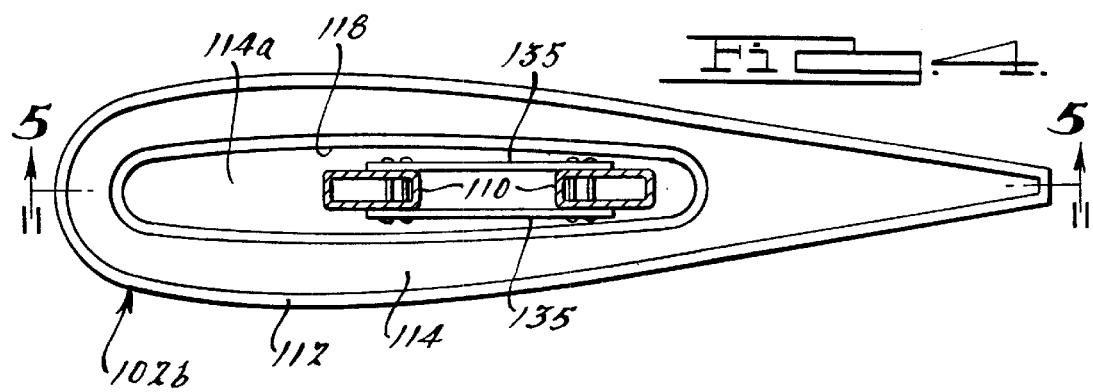
FIG. 4 is a cross sectional end view of one airfoil section taken in accordance with section line 4—4 in FIG. 2.

Referring to FIGS. 2–4, a pair of elongated, highly rigid and temperature resistant frame elements 110 are disposed in parallel relationship to one another and used for supporting each of the airfoil sections 102a–102d, the close-out panel 108, and the lower close-out panel and thermal barrier retainer 104. With specific reference to FIG. 3, it will be noted that each of the airfoil sections 102a–102d and the lower close-out panel and thermal barrier retainer 104 each include an oxide-CMC panel 112 which is comprised of preferably multiple plies of oxide-CMC fabric. The oxide-CMC panel 112 is fused over a substrate of rigid, ceramic foam insulation 114. The topmost outer mold line (OML) ply of the oxide-CMC panel 112 of each airfoil 102 is infused with a high-emissivity (i.e., black) coating, such as reactive cured glass (RCG) or silicon carbide, to provide plasma heating re-radiation outward to reduce internal temperatures of the airfoil section 102. The ceramic foam insulation 114 and the oxide-CMC panel 112 comprise an airfoil shape when viewed cord-wise. The ceramic foam insulation 114 includes a hollowed out section 114a through which the frame elements 110 extend. Integrally formed on an interior surface 116 of the ceramic foam insulation 114 is a plurality of lugs 118. In the preferred embodiment four such lugs 118 are formed on the interior surface 116 of the ceramic foam insulation 114. A pair of devises 120 are secured to each frame element 110 to allow each airfoil section 102 to be secured to the frame elements 110.

Referring further to FIGS. 2 and 3, the frame elements 110 preferably comprise titanium box beam members. A lower end 110a of each frame element 110 is secured to a torque box 122 (FIG. 2). This box 122 consists of a honeycomb sandwich-panel construction with access panels 124 included preferably in at least two locations on the torque box 122. Carrier panel 126 is provided to allow access to the torque box 122 and actuator spindle 125 which controls movement of the ruddervator 100. Preferably four carrier panels 126 are provided to allow access to the interior of the torque box 122. The torque box 122 is covered by a plurality of RCG toughened, uni-piece, fibrous insulation (TUFI) coated alumina-enhanced thermal barrier (AETB) tiles 128. Internal fittings (not shown) within the torque box 122 permit attachment of the frame elements 110 to the torque box 122 as well as to the fuselage actuator spindle 125. It will be appreciated that the structure comprising components 122–128 is known in the art and therefore has not been described in extensive detail.

With brief reference to FIGS. 6 and 7, each clevis 120 can be seen to include a pair of L-shaped plates 121a and 121b disposed in facing relation to one another and secured such as by rivets or any other suitable means to the frame element 110. One lug 118 is secured to each clevis 120 via a threaded nut and bolt fastener 130. With specific reference to FIG. 3, clevis 120a preferably includes a small hole 132, while devises 120b and 120c include oversized holes 134. Clevis 120d preferably includes a slotted hole 136. The oversized holes 134 and the slotted hole 136 allow for thermal expansion of the titanium box beam frame elements 110. The devises 120a–120d may comprise either inconel or titanium depending upon the temperatures expected to be encountered during flight.

Figure 5:
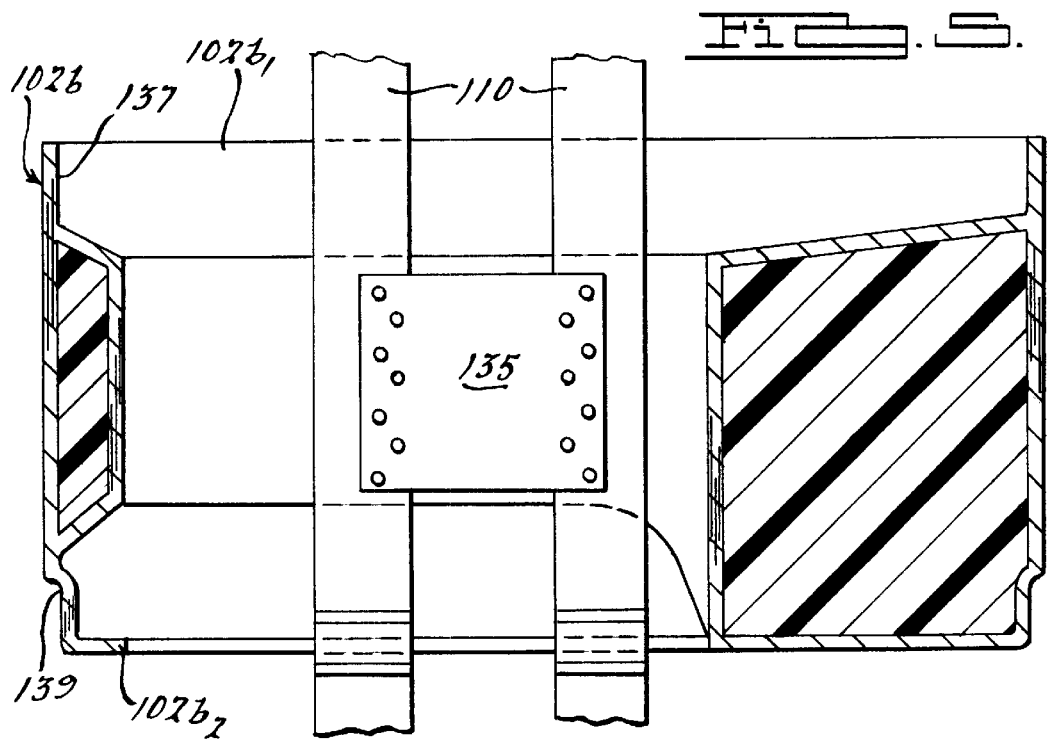
FIG. 5 is a cross sectional side view of one airfoil section taken in accordance with section line 5—5 in FIG. 4.

Referring to FIGS. 4 and 5, the two titanium box beam frame elements 110 can be seen to be secured in parallel relationship by a pair of plates 135. Preferably, a plurality of pairs of plates 135 are riveted or otherwise secured to the frame elements 110 at spaced apart locations along the frame elements. The plates 135 are preferably placed directly behind the oxide-CMC panel 112 where the re-radiation heating is the lowest to limit the surface temperature of the plates 135. The airfoil 102b can also be seen to include an internal shoulder 137 at an upper end $102b_1$ thereof, and a step portion 139 at a lower end $102b_2$. The shoulder portion 137 receives the step portion 139 of the adjacent airfoil section (i.e., airfoil section 102c, in this instance). Step portion 139 fits within the shoulder portion 137 of its lower adjacent airfoil section 102 (in this instance airfoil section 102a). The devises 120 permit the nested airfoil sections 102 to be pre-loaded to reduce inter-panel rubbing at the overlap areas of each panel during vibration and plasma leaks from thermal expansion. The overlap and pre-load also allow the stiffener flange of one panel 112 to help structurally stabilize the unstiffened end of the adjacent airfoil section 102.

During construction, the titanium box beam frame elements 110 and the plates 135 are assembled together first. The tip close-out panel 108 is the first component to be mounted onto the frame elements 110. This is illustrated in FIG. 8. Next the airfoil sections 102 are individually mounted by passing them over the lower end 110a of each of the frame elements 110 and positioning them over the previously mounted airfoil section 102. During the attachment of each airfoil section 102, the pre-load is applied at the devises 120. Once each of the airfoil sections 102 and the close-out panel 108 and thermal barrier retainer 104 are disposed over the frame elements 110, the entire assembly is hoisted onto the torque box 122 and attached via the access panel 124 in the torque box.

The application of oxide-CMC with the ruddervator 100 of the present invention serves to minimize fabrication costs by using a common design for each of the nesting airfoil sections 102 so that a single and common female lay-up mold can be used for fabricating each of the airfoil sections 102. The ruddervator 100 forms a lower cost and lower weight control element for an aerospacecraft and can be formed through even simpler fabrication processes, as well as maintained through less complex repair processes. Eliminating the need for oxidation protection coatings also serves to improve the life and reliability of the ruddervator 100. The construction techniques described in connection with the ruddervator 100 could also be used to form various hardware components for an aerospacecraft such as, but not limited to, elevon flipper doors, vent doors, external tank disconnect arrowhead panels and wing leading edge panels in the lower temperature zones of the vehicle.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An airfoil for a hypersonic space vehicle, comprising:

at least one elongated, heat resistant frame element;

a plurality of aerodynamically shaped airfoil sections, each of said airfoil sections comprised of an oxide ceramic matrix composite (oxide-CMC) fabric facesheet secured to an underlying rigid, ceramic foam insulation component having an airfoil shape;

a securing system for securing each of said airfoil sections adjacent to one another on said frame element; and wherein each said airfoil section has a first end and a second end, and where said second end of each said airfoil is nestably received within a portion of said first end of its adjacent said airfoil section.

2. The airfoil of claim 1, wherein each said airfoil section is formed from a plurality of said oxide-CMC fabric facesheets fused to said foam insulation component.

3. The airfoil of claim 1, wherein said frame element comprises an elongated, titanium frame element.

4. The airfoil of claim 1, wherein said frame element comprises a pair of elongated frame members disposed in parallel, side by side relationship and secured together by a plurality of planar members to form a rigid assembly.

5. The airfoil of claim 4, wherein said frame members comprise titanium box beam members.

6. An airfoil for a hypersonic space vehicle, comprising:

at least one elongated, heat resistant titanium beam element;

a plurality of first securing members fixedly secured to said beam element at spaced apart locations thereon;

a plurality of aerodynamically shaped airfoil sections adapted to be nestably disposed adjacent one another to form a single airfoil component, each of said airfoil sections comprised of an oxide ceramic matrix composite (oxide-CMC) fabric facesheet fused to an underlying rigid, ceramic foam insulation component having an airfoil shape when viewed in a chord-wise direction;

each said insulation component further having at least one second securing member for engaging with an associated one of said first securing members on said beam element to enable each said airfoil section to be fixedly secured to said beam element;

wherein said second securing members each comprise lugs formed to engage with said first securing member; and wherein said first securing members each comprise a clevis having an opening for engaging with one of said second securing members.

7. The airfoil of claim 6, wherein said beam element comprises a pair of titanium, elongated box type beams disposed generally parallel to one another; and a plurality of plates fixedly secured to said box type beam elements for holding said box type beam elements in spaced apart relation to one another and forming a rigid, beam type frame assembly adapted to be secured to a portion of said space vehicle.

* * * * *